United States Patent
Bryan

(10) Patent No.: US 8,256,186 B2
(45) Date of Patent: Sep. 4, 2012

(54) BUILDING ELEMENT AND METHOD

(76) Inventor: Steve Bryan, Nashville, TN (US)

( * ) Notice: Subject to any disclaimer, the term of this patent is extended or adjusted under 35 U.S.C. 154(b) by 164 days.

(21) Appl. No.: 12/193,038

(22) Filed: Aug. 17, 2008

(65) Prior Publication Data

US 2009/0047472 A1 Feb. 19, 2009

Related U.S. Application Data

(60) Provisional application No. 60/956,462, filed on Aug. 17, 2007.

(51) Int. Cl.
*E04C 3/00* (2006.01)

(52) U.S. Cl. .............................. 52/831; 52/854; 52/653.2

(58) Field of Classification Search .................... 52/479, 52/455, 456, 457, 831, 850, 851, 852, 853, 52/854, 855, 856, 857, 503, 561, 233, 783.1, 52/801.1, 801.11, 630, 653.2, 654.1, 585.1, 52/859.1, 592.1
See application file for complete search history.

(56) References Cited

U.S. PATENT DOCUMENTS

| | | | | |
|---|---|---|---|---|
| 861,348 A * | 7/1907 | Baltz | ........................... | 52/589.1 |
| 1,156,753 A * | 10/1915 | Carey | ........................... | 52/592.1 |
| 1,555,433 A * | 9/1925 | Olsson | ........................ | 52/592.1 |
| 1,578,344 A * | 3/1926 | Treadway | .................... | 52/592.1 |
| 3,466,821 A * | 9/1969 | Cooper et al. | .............. | 52/204.1 |
| 5,865,929 A * | 2/1999 | Sing | .............................. | 156/264 |
| 5,870,876 A * | 2/1999 | Deiter | ............................. | 52/845 |
| 6,244,009 B1* | 6/2001 | Cerrato | .......................... | 52/604 |
| 6,247,286 B1* | 6/2001 | Heyns | ......................... | 52/589.1 |
| 6,513,293 B2* | 2/2003 | Miller | ......................... | 52/405.1 |
| 2003/0182891 A1* | 10/2003 | Reichartz | ..................... | 52/720.1 |
| 2005/0252134 A1* | 11/2005 | Makovich | ....................... | 52/503 |
| 2006/0010810 A1* | 1/2006 | Muszynski | ..................... | 52/503 |
| 2008/0202053 A1* | 8/2008 | Guy et al. | ....................... | 52/391 |

* cited by examiner

Primary Examiner — Jessica Laux
(74) Attorney, Agent, or Firm — W. Edward Ramage; Baker Donelson

(57) ABSTRACT

A formed building element or "log" comprising a top filler section and a bottom filler section affixed on opposite sides of a center reinforcement member. The center reinforcement member may be a steel or metal rod or tube. The reinforcement member, which may be of approximately the same length of the filler sections, has one end extending out from the end of the building element. The extended end may have a vertical hole extending from top to bottom, adapted to accept a rod pin, which may or may not be threaded. Matching holes extend from the top to bottom of the filler section at the opposite end of the building element, so adjacent building elements may be attached end-to-end.

14 Claims, 2 Drawing Sheets

BUILDING ELEMENT AND METHOD

This application claims priority to Provisional Patent Application No. 60/956,462, filed Aug. 17, 2007, entitled "Building Element and Method," and is entitled to that filing date for priority. The complete disclosure, specification, drawings and attachments of Provisional Patent Application No. 60/956,462 are incorporated herein in their entirety by reference.

FIELD OF INVENTION

This invention relates to a method of framing and constructing buildings by stacking formed building elements.

SUMMARY OF INVENTION

In one exemplary embodiment, the present invention generally provides a building element having a proximal end, a distal end, and a length between said proximal and distal ends, comprising a top filler section, a bottom filler section, and a reinforcement member, wherein the top filler section, bottom filler section, and reinforcement member each have first and second surfaces opposite and parallel to one another, third and fourth surfaces opposite and parallel to one another, and wherein the third and fourth surfaces are perpendicular to the first and second surfaces.

The first and second surfaces of the building element each describe a width and the third and fourth surfaces each describe a height, the top filler section, bottom filler section, and reinforcement member each have a length perpendicular to their height and width, and the top filler section, bottom filler section, and reinforcement member each have a proximal end at, approximately, the building element proximal end, and a distal end at, approximately, the building element distal end.

The top filler section second surface is affixed to the reinforcement member first surface, and the bottom filler section first surface is affixed to the reinforcement member second surface. The top and bottom filler sections may be of wood, compressed wood, wood pulp, artificial material, or other material known in the art to be used in place of wood, while the reinforcement member may be a metal rod or tube, preferably a steel tube.

In another embodiment, the reinforcement member, top filler section, and bottom filler section widths may be approximately equal to one another. The building element may then further comprise a side panel affixed to the reinforcement member third surface, the top filler section third surface, the bottom filler section third surface, any two of the third surfaces, or all three of the third surfaces. Optionally, the building element may further comprise a side panel affixed to the reinforcement member fourth surface, the top filler section fourth surface, the bottom filler fourth surface, any two of the fourth surfaces, or all three of the fourth surfaces.

In another embodiment, the top filler section and bottom filler section widths may be equal to one another but greater than the reinforcement member width. The building element may further comprise a side panel between the top filler section second surface and the bottom filler first surface, and affixed to at least the reinforcement member third surface. Optionally, the building element may further comprise a side panel between the top filler section second surface and the bottom filler first surface, and affixed to at least the reinforcement member fourth surface.

In another embodiment of the present invention, the top filler section length, bottom filler section length, and reinforcement member length are all about the same as one another. In one aspect of this embodiment, the reinforcement member proximal end extends proximally of the top filler section and bottom filler section proximal ends, and the top filler section and bottom filler section distal ends extend distally of the reinforcement member distal end. In this aspect, the building element proximal end further comprises a hole proximal to the top filler section and bottom filler section proximal ends, perpendicular to the reinforcement member width, and extending from the reinforcement member first surface to the reinforcement member second surface. The building element distal end further comprises matched holes distal to the reinforcement member distal end, perpendicular to the top filler section and bottom filler section widths, and extending from the top filler section first surface to the top filler section second surface, and from the bottom filler section first surface to the bottom filler second surface.

In another embodiment of the present invention, the top filler section first surface further comprises a tongue extending upward for at least part of the top filler section length, and the bottom filler section second surface further comprises a groove extending for at least part of the bottom filler section length, wherein the tongue is adapted to be inserted into groove.

In yet another embodiment of the present invention, the reinforcement member is 2" wide and 4" high, and the top and bottom filler sections are each 4.5" wide and 4" high, the reinforcement member is made of steel tubing and the top and bottom filler sections are made of wood, the reinforcement member proximal end extends 4.5" beyond the proximal ends of the top and bottom filler proximal ends, and the top and bottom filler distal ends extend 4.5" distally beyond the distal end of the reinforcement member distal end. In another embodiment, the top filler section first surface further comprises a tongue extending for least part of the top filler section length, and the bottom filler section second surface further comprises a groove extending for at least part of the bottom filler section length.

DETAILED DESCRIPTION OF THE INVENTION

Figure 1:
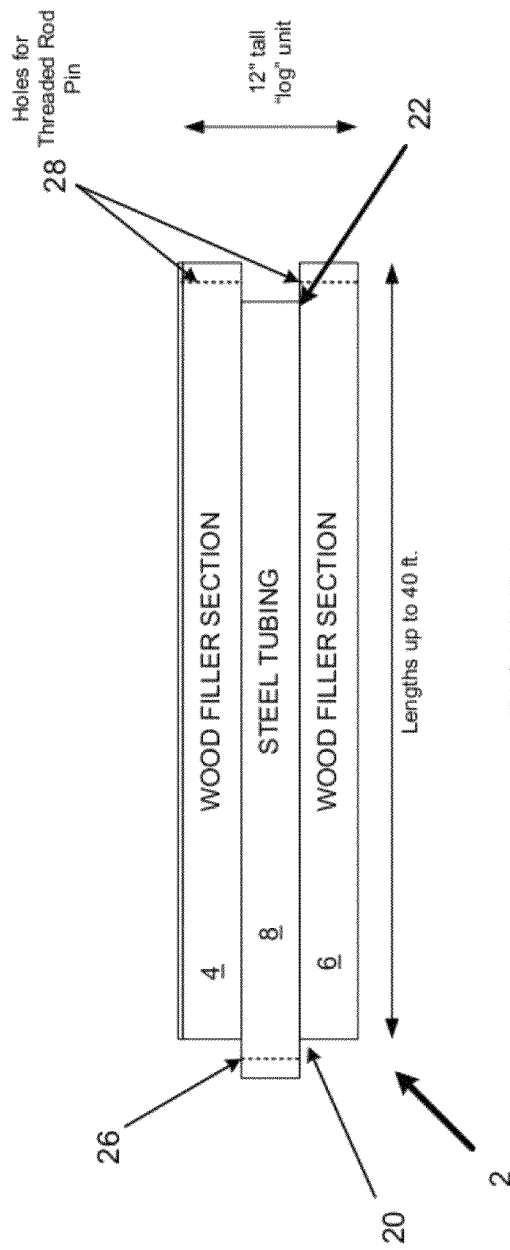
FIG. 1 shows a building element in accordance with one embodiment of the present invention.
Figure 2:
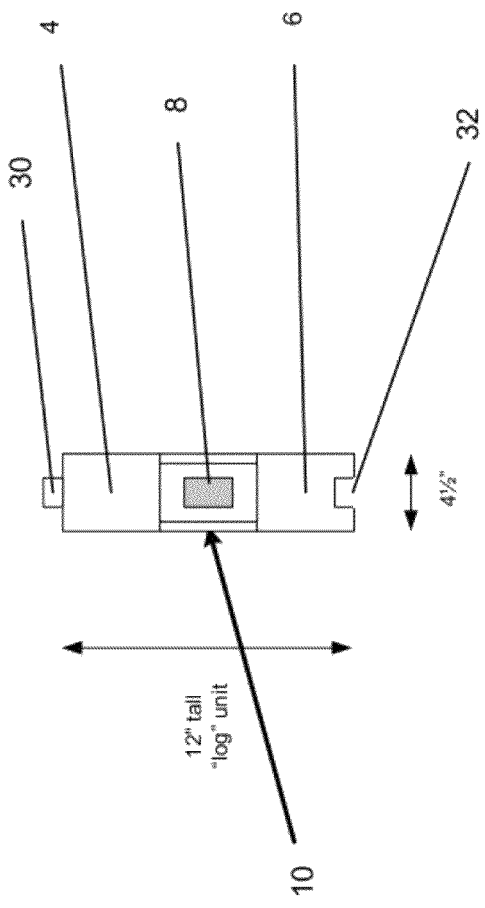
FIG. 2 shows a cross-section view of a building element in accordance with one embodiment of the present invention.

A formed building element (or "log") 2 is shown in FIGS. 1-4. The building element 2 comprises a top filler section 4 and a bottom filler section 6 affixed on opposite sides of a center reinforcement member 8. The filler sections 4, 6 may comprise wood, compressed wood or wood pulp, artificial material, or other material that is known in the art to be used in place of wood. The center reinforcement member 8 may be a steel or metal rod or tube, as shown in FIG. 1. The filler sections may be affixed to the center reinforcement member by any suitable means known in the art, including adhesives, glue, or bolting.

Figure 4:
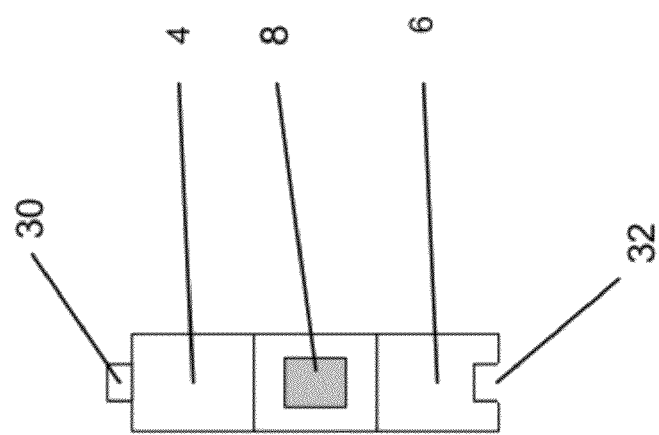
FIG. 4 shows a cross-section view of a building element in accordance with another embodiment of the present invention.
Figure 3:
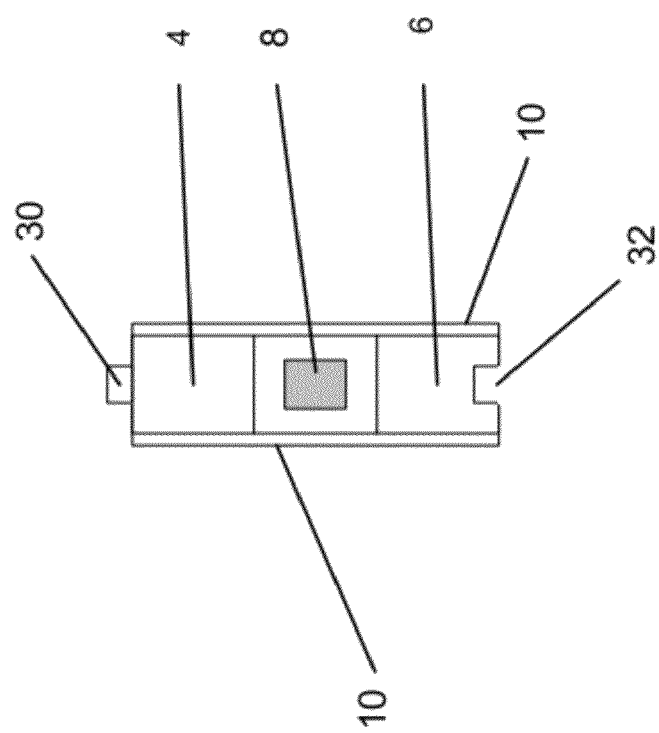
FIG. 3 shows a cross-section view of a building element in accordance with another embodiment of the present invention.

In one exemplary embodiment, the width of the center reinforcement member is the same width as the filler sections, so that the reinforcement member may be seen from the side, as seen in FIG. 3. In another exemplary embodiment, side panels 10 may be affixed to the sides of the building element. This allows other types of siding to be nailed, screwed, or otherwise affixed to the building. The side panels may extend for a portion of or the entire height of the building element as seen in FIG. 4. Alternatively, as shown in FIG. 1, the width of the center reinforcement member 8 may be slightly less than the width of the filler sections, and the side panels 10 of suitable height and depth to match the height of the center reinforcement member and be flush with the faces of the filler sections when inserted over and affixed to the reinforcement section.

In one exemplary embodiment, the reinforcement member, which may be of approximately the same length of the filler sections, has one end 20 extending out from the end of the building element, with the other end 22 withdrawn inside the building element. The extended end 20 may have a vertical hole 26 extending from top to bottom, adapted to accept a rod pin, which may or may not be threaded. Matching holes 28 extend from the top to bottom of the filler section at the opposite end of the building element. This construction enables adjacent building elements to be attached end-to-end, with the extended end 20 inserted into the space in the corresponding opposite end of the adjacent building element, whereupon a rod pin is inserted through the holes to fasten the two building elements together. In embodiments where the side panels cover only the reinforcement section, as shown in FIG. 1, the same building elements can be used to construct any configuration at desired angles, such as 90 degree corners and straight walls. If the side panels extend the entire height of the building element, then special corner building elements may be constructed so that a section of side panel on the inside of the receiving building element corresponding to the open space may be removed to allow insertion of the extended end 20 of the adjacent building element.

In yet another embodiment, the top filler section 4 may further comprise a tongue 30 extending upward for some or all of the length of the top filler section. As shown in FIG. 4, the tongue may be in the center of the top of the top filler section. The tongue is adapted to be inserted into a matching groove or notch 32 in the bottom of the bottom filler section of the vertically-adjacent building elements.

Multiple building elements can thereby be stacked on top of each other in the same horizontal plane, instead of every other row (i.e., overlapping every row).

In one exemplary embodiment, the building element is 12 feet in length with 2"×4" (width×height) steel tubing as the reinforcement member. The filler sections are 4.5"×4" (width×height) sections made of wood or recycled material, and affixed to the steel tubing by bolts. The building element thus is 4.5 inches wide and 12 inches in height. The sides of the steel tubing are covered with 1.25" thick wood (or substitute) planking that matches the surfaces of the top and bottom filler sections. The steel tubing extends 4.5 inches from the end of the building element, creating a 4.5 inch notch at the opposite end. This 4.5 inch length corresponds with the 4.5 inch thickness of the building element. The building elements are then stacked horizontally with each corner or connection pinned using threaded rods and bolts through the pre-drilled holes.

With the system of the present method, a building can be erected and disassembled in much less time than pre-fab or modular homes currently known in the art.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

I claim:

1. A construction system with multiple building elements having a proximal end, a distal end, and a length between said proximal and distal ends, comprising:

a plurality of stackable building elements that are attachable end-to-end, each building element comprising an integral combination of a top filler section, a bottom filler section, and a reinforcement member, wherein the top filler section, bottom filler section, and reinforcement member each are square or rectangular in cross-section with four sides and each have first and second surfaces opposite and parallel to one another, and third and fourth surfaces opposite and parallel to one another, wherein the third and fourth surfaces are perpendicular to the first and second surfaces;

wherein the first and second surfaces each describe a width and the third and fourth surfaces each describe a height;

further wherein the top filler section, bottom filler section, and reinforcement member each have a length perpendicular to their height and width, and wherein the top filler section, bottom filler section, and reinforcement member each have a proximal end at, approximately, the building element proximal end, and a distal end at, approximately, the building element distal end;

further wherein the top filler section second surface is affixed to the reinforcement member first surface, and the bottom filler section first surface is affixed to the reinforcement member second surface;

further wherein the top filler section length, bottom filler section length, and reinforcement member length are all about the same as one another; and further wherein the reinforcement member, top filler section, and bottom filler section widths are about equal to one another.

2. The system of claim 1, further comprising a side panel, wherein at least one side panel is affixed to at least the reinforcement member third surface.

3. The system of claim 1, wherein the top filler section and bottom filler section widths are equal to one another but greater than the reinforcement member width, further comprising at least one side panel affixed to at least the reinforcement member third surface.

4. A construction system with multiple building elements having a proximal end, a distal end, and a length between said proximal and distal ends, comprising:

a plurality of stackable building elements that are attachable end-to-end, each building element comprising an integral combination of a top filler section, a bottom filler section, and a reinforcement member, wherein the top filler section, bottom filler section, and reinforcement member each are square or rectangular in cross-section with four sides and each have first and second surfaces opposite and parallel to one another, and third and fourth surfaces opposite and parallel to one another, wherein the third and fourth surfaces are perpendicular to the first and second surfaces;

wherein the first and second surfaces each describe a width and the third and fourth surfaces each describe a height;

further wherein the top filler section, bottom filler section, and reinforcement member each have a length perpendicular to their height and width, and wherein the top filler section, bottom filler section, and reinforcement member each have a proximal end at, approximately, the building element proximal end, and a distal end at, approximately, the building element distal end;

further wherein the top filler section second surface is affixed to the reinforcement member first surface, and the bottom filler section first surface is affixed to the reinforcement member second surface;

further wherein the top filler section length, bottom filler section length, and reinforcement member length are all about the same as one another;

further wherein the reinforcement member is offset lengthwise in relation to the top and bottom filler elements, so that the proximal end of the reinforcement member extends further lengthwise than the top filler section and bottom filler section proximal ends; and further wherein the building element proximal end further comprises a hole proximal to the top filler section and bottom filler section proximal ends, perpendicular to the reinforcement member width, and extending from the reinforcement member first surface to the reinforcement member second surface; and wherein the building element distal end further comprises matched holes distal to the reinforcement member distal end, perpendicular to the top filler section and bottom filler section widths, and extending from the top filler section first surface to the top filler section second surface, and from the bottom filler section first surface to the bottom filler second surface.

5. The system of claim 4, wherein the top filler section first surface further comprises a tongue extending for at least part of the top filler section length; and wherein the bottom filler section second surface further comprises a groove extending for at least part of the bottom filler section length.

6. The system of claim 4, wherein:
the reinforcement member is 2" wide and 4" high, and the top and bottom filler sections are each 4.5" wide and 4" high;
the reinforcement member is made of steel tubing and the top and bottom filler sections are made of wood;
the reinforcement member proximal end extends 4.5" beyond the proximal ends of the top and bottom filler proximal ends; and
the top and bottom filler distal ends extend 4.5" distally beyond the distal end of the reinforcement member distal end.

7. A construction system with multiple building elements having a proximal end, a distal end, and a length between said proximal and distal ends, comprising:
a plurality of stackable building elements that are attachable end-to-end, each building element comprising an integral combination of
a top filler section, a bottom filler section, and a reinforcement member, wherein the top filler section, bottom filler section, and reinforcement member each are square or rectangular in cross-section with four sides and each have first and second surfaces opposite and parallel to one another, and third and fourth surfaces opposite and parallel to one another, wherein the third and fourth surfaces are perpendicular to the first and second surfaces;

wherein the first and second surfaces each describe a width and the third and fourth surfaces each describe a height;

further wherein the top filler section, bottom filler section, and reinforcement member each have a length perpendicular to their height and width, and wherein the top filler section, bottom filler section, and reinforcement member each have a proximal end at, approximately, the building element proximal end, and a distal end at, approximately, the building element distal end;

further wherein the top filler section second surface is affixed to the reinforcement member first surface, and the bottom filler section first surface is affixed to the reinforcement member second surface;

further wherein the top filler section length, bottom filler section length, and reinforcement member length are all about the same as one another; and further wherein the top filler section first surface further comprises a tongue extending for at least part of the top filler section length; and wherein the bottom filler section second surface further comprises a groove extending for at least part of the bottom filler section length.

8. The system of claim 7, wherein the top and bottom filler sections are made in whole or in part from wood, compressed wood, or wood pulp.

9. The system of claim 7, wherein the reinforcement member is a metal rod or tube.

10. A construction system with multiple building elements element, comprising:
a plurality of stackable building elements that are attachable end-to-end, each building element comprising an integral combination of
a single reinforcement member square or rectangular in cross-section with four sides, and with a first end and second end;
a single top filler element square or rectangular in cross-section with four sides, and with a first end and second end, affixed along one side to one side of the reinforcement member; and
a single bottom filler element square or rectangular in cross-section with four sides, and with a first end and second end, affixed along one side to the side of the reinforcement member opposite the top filler element;
wherein the reinforcement member, top filler element, and bottom filler element are approximately equal in length, and the reinforcement member is offset lengthwise in relation to the top and bottom filler elements, so that the first end of the reinforcement member extends further lengthwise than the top filler section and bottom filler section first ends to form a male end of the building element, and the top filler section and bottom filler section second ends extend further lengthwise than the reinforcement member second end to form a female end of the building element;

further wherein the male end of a building element comprises a tongue extending outward for at least part of the top filler section length on the side opposite the reinforcement member; and the female end of a building element comprises a groove extending inward for at least part of the bottom filler section length on the side opposite the reinforcement member;

wherein the male end of one building element is connected to the female end of an adjacent building element by the groove being adapted to receive the tongue of an adjacent building element.

11. The system of claim 10, further comprising a hole in the first end of the reinforcement member, and matching holes in the second ends of the top and bottom filler elements.

12. The system of claim 10, further comprising a first side panel running lengthwise along one side of the building element, said first side panel affixed to one or more of the reinforcement member, top filler element, and bottom filler element.

13. The system of claim 12, further comprising a second side panel running lengthwise along the side of the building element opposite the first side panel.

14. The system of claim 10, further wherein a plurality of building elements are stacked vertically to form a building structure.

* * * * *